United States Patent
Hardin et al.

(10) Patent No.: US 10,043,167 B2
(45) Date of Patent: Aug. 7, 2018

(54) MOBILE POINT-OF-SALE (POS) TECHNIQUES

(75) Inventors: Clay Norris Hardin, Marietta, GA (US); Charles David Blevins, Suwanee, GA (US); Dustin Burke, Atlanta, GA (US); Jamie Grant Burks, Collierville, TN (US); Lawrence David Parker, South Burlington, VT (US)

(73) Assignee: NCR Corporation, Atlanta, GA (US)

( * ) Notice: Subject to any disclaimer, the term of this patent is extended or adjusted under 35 U.S.C. 154(b) by 227 days.

(21) Appl. No.: 13/548,889

(22) Filed: Jul. 13, 2012

(65) Prior Publication Data

US 2014/0019274 A1    Jan. 16, 2014

(51) Int. Cl.
G06Q 20/20    (2012.01)
G06Q 20/32    (2012.01)

(52) U.S. Cl.
CPC .......... *G06Q 20/20* (2013.01); *G06Q 20/202* (2013.01); *G06Q 20/322* (2013.01)

(58) Field of Classification Search
CPC ............................ G06Q 20/20; G06Q 20/202
USPC ...................................... 705/16, 21
See application file for complete search history.

(56) References Cited

U.S. PATENT DOCUMENTS

| 5,285,382 | A  | * | 2/1994  | Muehlberger et al. ........ 705/17  |
| 2003/0043406 | A1 | * | 3/2003  | Wells et al. .................. 358/1.15 |
| 2005/0049886 | A1 | * | 3/2005  | Grannan et al. ................. 705/1 |
| 2007/0179900 | A1 | * | 8/2007  | Daase et al. ................... 705/59 |
| 2007/0203719 | A1 | * | 8/2007  | Kenagy et al. .................. 705/1 |
| 2008/0270310 | A1 | * | 10/2008 | DeGraaff et al. ............... 705/58 |
| 2009/0037287 | A1 | * | 2/2009  | Baitalmal et al. .............. 705/26 |
| 2009/0276228 | A1 | * | 11/2009 | Isaacson ........................ 705/1 |
| 2009/0282404 | A1 | * | 11/2009 | Khandekar et al. ............. 718/1 |
| 2009/0287582 | A1 | * | 11/2009 | Nath et al. ..................... 705/26 |
| 2009/0316709 | A1 | * | 12/2009 | Polcha et al. ................ 370/401 |
| 2010/0037057 | A1 | * | 2/2010  | Shim et al. ................... 713/171 |
| 2010/0262467 | A1 | * | 10/2010 | Barnhill et al. ................ 705/10 |
| 2011/0010234 | A1 | * | 1/2011  | Lindelsee et al. ......... 705/14.23 |
| 2011/0055030 | A1 | * | 3/2011  | Nicolas et al. ................. 705/16 |
| 2011/0131105 | A1 | * | 6/2011  | Aonuma et al. ............... 705/24 |
| 2011/0307317 | A1 | * | 12/2011 | Bortolin et al. ........... 705/14.33 |
| 2012/0042004 | A1 | * | 2/2012  | Shenfield ..................... 709/203 |
| 2012/0062363 | A1 | * | 3/2012  | St George et al. .......... 340/5.64 |
| 2012/0150669 | A1 | * | 6/2012  | Langley et al. ............... 705/16 |
| 2012/0166264 | A1 | * | 6/2012  | Shum et al. ............... 705/14.17 |
| 2012/0191522 | A1 | * | 7/2012  | McLaughlin et al. ..... 705/14.23 |

(Continued)

OTHER PUBLICATIONS

Cashier Live, Phone Point-Of-Sale App, http://www.cashierlive.come/iphone-pos-app (Mar. 16, 2012).*

(Continued)

*Primary Examiner* — Florian M Zeender
*Assistant Examiner* — Christopher R Buchanan
(74) *Attorney, Agent, or Firm* — Schwegman, Lundberg & Woessner

(57) ABSTRACT

Mobile POS techniques are presented. A POS interface is configured and distributed to a mobile device over a network connection. The POS interface is a self-contained retail transaction system for a retailer. The mobile device is configured to execute the retail transaction system providing remote network or cloud-based services for data retrieval, and data storage to the retail transaction system on the mobile device. One or more retail transactions are processed on the mobile device via the POS interface.

10 Claims, 24 Drawing Sheets

(56) References Cited

U.S. PATENT DOCUMENTS

| | | | |
|---|---|---|---|
| 2012/0233006 A1* | 9/2012 | St. George | G07G 1/0018 705/18 |
| 2012/0290376 A1* | 11/2012 | Dryer et al. | 705/14.23 |
| 2013/0067170 A1* | 3/2013 | Lam | 711/137 |
| 2013/0091042 A1* | 4/2013 | Shah et al. | 705/35 |

OTHER PUBLICATIONS

Ecommerce Solution Profile: Counterpoint Online; 2008.
Solution Profile: Counterpoint SQL; 2006.
Radiant Systems Unveils Upcoming Mobile Platform for Retailers at User Conference; May 12, 2011.
Sell Anywhere with CPMobile.
NCR introduces CPMobile, transforming the way specialty retailers run their business; Sep. 26, 2011.

* cited by examiner

MOBILE POINT-OF-SALE (POS) TECHNIQUES

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like.

Although a lot of automation has occurred with respect to consumer transactions, very little has occurred with respect to a retailer. That is, the focus in the industry has been on automating self-service consumer-based transactions and little focused has been on streamlining and automating the retailer's actions during a transaction.

For the most part, automation for retailers has focused on payment collection. For example, services such as PayPal® permit consumers to bypass traditional requirements (hardware and software) from credit card agencies and still accept credit card payment using the PayPal® system as an intermediary. This was a significant improvement for small retailers that could not afford the time or money associated with becoming an approved major credit card service provider because with PayPal® the retailer only needs an email address and bank account to accept all major credit cards from its consumers.

However, retention of consumer records, transaction details, inventory, and pricing information are still left to retailer-based systems. This means that retailers must purchase and maintain these systems as part of their ongoing business operations. Many of these retailer systems can be purchased off-the-shelf and initially configured for the retailer for use. Such systems still remain pricey for small retailers and still require a significant amount of in-house maintenance and support.

Moreover, nowadays many retailers like the ability to be mobile to attend special events, such as tradeshows, sporting events, and the like. The existing retailer-based systems are not meant to be portable and setup at remote sites can be time consuming and require network connectivity along with many power outlets for multiple devices that need powered at remote sites.

SUMMARY

In various embodiments, mobile point-of-sale (POS) techniques are presented. According to an embodiment, a method for remotely distributing a (POS) interface is provided.

Specifically, a request is received from a retailer for a point-of-sale (POS) interface. The POS interface is configured as a self-contained retail transaction system for a retailer. Next, the POS interface is delivered to a mobile device for execution on the mobile device.

DETAILED DESCRIPTION

Figure 1:
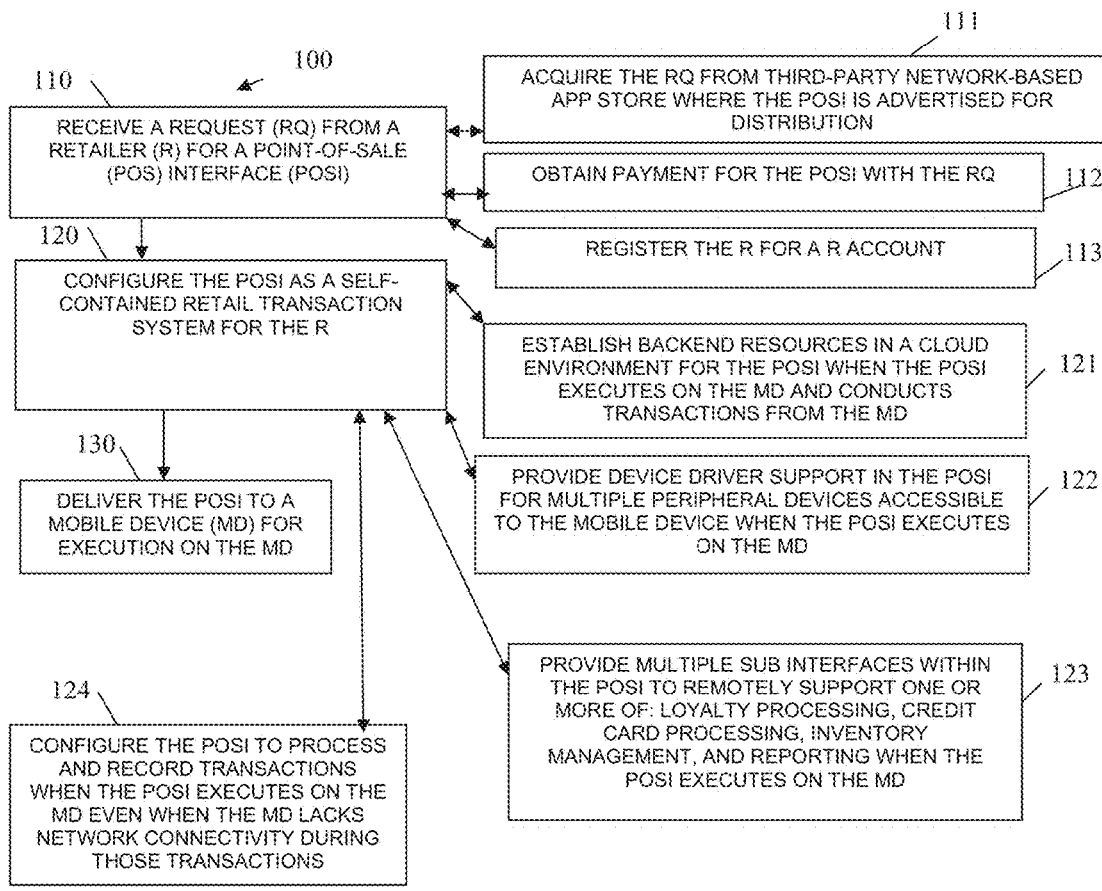
FIG. 1 is a diagram of a method for remotely distributing a POS interface, according to an example embodiment.

FIG. 1 is a diagram of a method 100 for remotely distributing a POS interface, according to an example embodiment. The method 100 (hereinafter "POS distribution service") is implemented as instructions programmed and residing on a non-transitory computer-readable (processor-readable) storage medium and executed by one or more processors, server, web-based Internet portal, cloud, virtual machine (VM), etc.) over a network connection. The processors are specifically configured and programmed to process the POS distribution service. The POS distribution service also operates over a network. The network is wired, wireless, or a combination of wired and wireless.

As used herein the phrases and terms "cloud," "cloud processing environment," network-based processing environment," and/or "remote processing environment," may be used interchangeably and synonymously. These entities refer to a remote network environment that provide data and processing services and can be accessed remotely over a network connection from a device, such as a mobile device.

A "mobile device" refers to a laptop, a tablet (Android or Apple® based), and/or a phone. As will become more apparent herein and below, a retailer uses its mobile device to process a POS interface, which is a self-contained transaction processing system encapsulated as an app that is dynamically downloaded, installed, and initiated on the mobile device and that interacts during operation with a cloud processing environment that provides backend retail transaction services and/or information.

At 110, the POS distribution service receives a request from a retailer for a POS interface. Again, the POS interface is an encapsulated app for retail transaction processing. Receipt of the request can occur in a variety of manner.

According to an embodiment, at 111, the POS distribution service acquires the request from a third-party network-based app store where the POS interface is advertised for distribution. This can be the traditional App Store®, the Android Market®, or other network-based app stores.

In another case, at 112, the POS distribution service obtains payment for the POS interface with the request. Payment can be obtained directly from the POS distribution service or alternatively payment can be obtained indirectly from a third-party service, such as the network-based app store described above with the embodiment at 111.

In another situation, at 113, the POS distribution service registers the retailer for a retail account. That is, a registration process can be used to initially register a retailer for access and acquisition of the POS interface. A variety of configuration information can be obtained during the registration process from the retailer, such as but not limited to: identification of services that the retailer needs (loyalty processing, peripheral device drivers, credit card processing, accounting services, and others), reporting requirements, and others.

At 120, the POS distribution service configures the POS interface as a self-contained retail transaction system for the retailer. The identity of the retailer can be used for configuration as well as parameters associated with the services and preferences of the retailer. Moreover, a variety of different levels of out-sourced retail transactions services can be offered and configured as part of the license associated with the POS interface. For instance, a premium level may include full reporting and accounting capabilities on demand, where as a lower level of service subscription may include a limited number of reports over a confined period of time and limited accounting services.

According to an embodiment, at 121, the POS distribution service establishes backend resources in a cloud processing environment for the POS interface when the POS interface executes on the mobile device and conducts transactions from the mobile device. The resources can be data storage and retrieval services as well as: reporting, accounting, and loyalty services. This can be customized based on the retailer and/or based on a specific level of service purchased by the retailer.

In another case, at 122, the POS distribution service provides device driver support in the POS interface for multiple peripheral devices, which are accessible to the mobile device when the POS interface executes on the mobile device. Some example peripheral devices include, by way of example only: a printer, a barcode scanner, a remote display, a remote computer, a weighing device for produce, a magnetic card reader, and the like.

In still another situation, at 123, the POS distribution service provides multiple sub interface within the POS interface to remotely support over a network connection a variety of services, such as: loyalty processing, credit card processing, inventory manager, and reporting when the POS interface executes on the mobile device.

In one case, at 124, the POS distribution service configures the POS interface to process and record transactions when the POS interface executes on the mobile device and when the mobile device lacks network connectivity during those transactions. In other words, the POS distribution service can configure the POS interface for batch transactions that require no backend network connection to cloud services; these off-line transactions can be synchronized and updated to the backend retail services when the mobile device re-acquires network connectivity at a later point in time. So, transactions can occur even when network access is down.

At 130, the POS distribution service delivers the POS interface to a mobile device for execution on the MD. Delivery occurs over a network connection directly to the mobile device. In one case, delivery occurs over a wireless network, such as a cellular network, a Wi-Fi network, a Bluetooth network, and the like.

Figure 2:
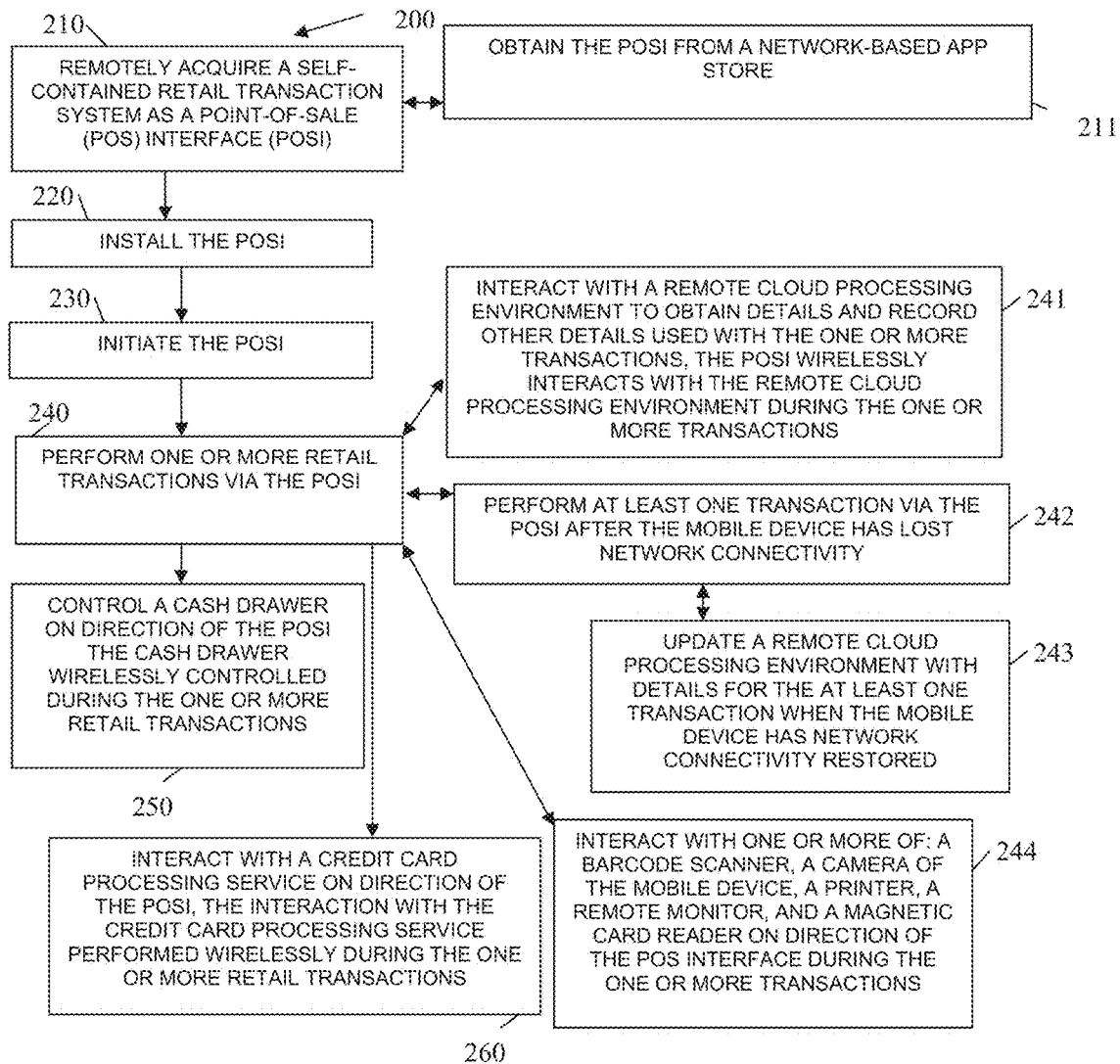
FIG. 2 is a diagram of a method for processing the POS interface on a mobile device, according to an example embodiment.

FIG. 2 is a diagram of a method 200 for processing the POS interface on a mobile device, according to an example embodiment. The method 200 (hereinafter "POS interface manager") is implemented as instruction and programmed within a non-transitory computer-readable (processor-readable) storage medium that executes on one or more processors of a mobile device; the processors of the mobile device are specifically configured to execute the POS interface manager. The POS interface manager is operational over a network; the network is wired, wireless, or a combination of wired and wireless.

The processing of the POS interface manager reflects processing of the POS interface on a mobile device; the POS interface is distributed by the POS distribution service represented by the method 100 of the FIG. 1.

At 210, the POS interface manager remotely acquires a self-contained retail transaction processing system as a POS interface. The mechanism for distributing the POS interface was presented above with reference to the POS distribution service represented by the method 100 of the FIG. 1.

According to an embodiment, at 211, the POS interface manager obtains the POS interface from a network-based app store. This occurs when a user associated with the retailer access the app store and makes selections to find, purchase (if required), and download the POS interface.

At 220, the POS interface manager installs the POS interface;

At 230, the POS interface manager initiates the POS interface on the mobile device.

At 240, the POS interface manager performs one or more retail transactions via the POS interface.

According to an embodiment, at 241, the POS interface manager interacts with a remote cloud processing environment to obtain details and record other details used with the one or more transactions. The POS interface wirelessly interacts with the remote cloud processing environment during the one or more transactions. That is, a complete backend retail transaction processing system exists in a cloud that is accessible to and interacts with the POS interface that processes on the mobile device (phone, tablet, laptop, etc.).

In an embodiment, at 242, the POS interface manager performs at least one transaction via the POS interface after the mobile device has lost network connectivity. So, this particular transaction is entirely performed on the mobile device and without any network services being needed.

Continuing with the embodiment of 242 and at 243, the POS interface manager updates a remote cloud processing environment with details for the at least one transaction when the mobile device has network connectivity restored.

In another situation, at 244, the POS interface manager interacts with one or more of: a barcode scanner, a camera of the mobile device, a printer, a remote monitor, and/or a magnetic card reader on direction of the POS interface during the one or more transactions. These peripheral devices can be connected directly to the mobile device or can be wirelessly communicated with from the mobile device. In one case, an integrated camera of the mobile device is used to perform barcode scanning of products or loyalty cards during the transactions.

According to an embodiment, at 250, the POS interface manager controls a cash drawer on direction of the POS interface. The cash drawer is wirelessly controlled during the one or more transactions. So, during the transaction the POS interface can dispense coins automatically based on cash given and a sales price and/or can automatically unlock and open a cash drawer for a cashier to complete the transaction being processed.

In an embodiment, at 260, the POS interface manager interacts with a credit card processing service on direction of the POS interface. This interaction with the credit card processing service is performed wirelessly during the one or more retail transactions.

It is also noted that a variety of other beneficial features can be used with the POS interface including emailing or texting receipts from the mobile device to a consumer's email account or consumer's phone. The email or text initiated on the mobile device, via the POS interface, and the actual sending of the email or text may occur in some instances from the cloud processing environment interacting with the POS interface.

One now appreciates how an entire POS retail transaction processing system can be portable and processed on mobile devices, such as phones or tablets. This means that start up retailers or even consumers attempting to run their own businesses can near instantaneously run a retail transaction system from anywhere, the POS interface can also be run when network connectivity is lost as described above. More complex retail processing for accounting, reporting, loyalty and the like can be automatically integrated to the portable POS interface via a network connection to a cloud environment providing such services.

Figure 3:
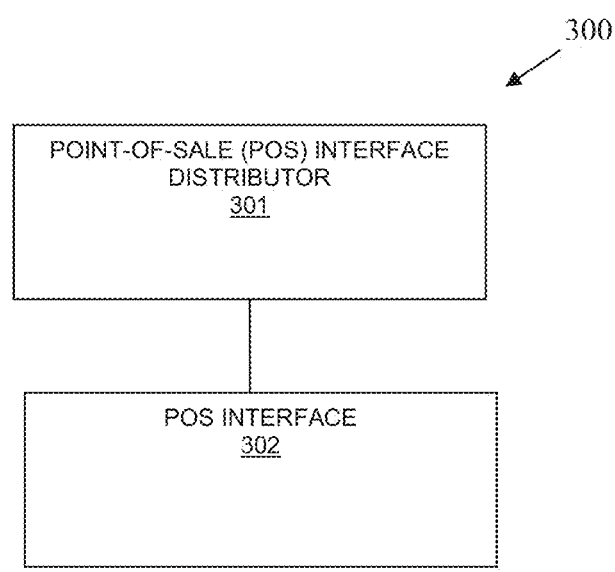
FIG. 3 is a diagram of a mobile POS system, according to an example embodiment.

FIG. 3 is a diagram of a mobile POS system 300, according to an example embodiment. The components of the mobile POS system 300 are implemented as executable instructions and programmed within a non-transitory computer-readable (processor-readable) storage medium that execute on one or more processors of a network-based server (cloud, proxy, Virtual Machine (VM), etc.) and/or a standalone machine (client device (laptop, tablet, computer), cashier-manned checkout station, self-service checkout station, kiosk, etc.); the processors are specifically configured to execute the components of the mobile POS system 300. The mobile POS system 300 is also operational over a network; the network is wired, wireless, or a combination of wired and wireless.

The mobile POS system 300 includes a POS distribution service 301 and POS interface 302. Each of these components and the interactions of each component are now discussed in turn.

The mobile POS system 300 includes a one or more network-based processors, which are accessible over a network connection (wired, wireless, or a combination of wired and wireless). The one or more processors include execution instructions for the POS distribution service 301, which resides and is programmed within a non-transitory computer-readable storage medium and processed on the one or more processors. Example processing associated with the POS distribution service 301 was presented in detail above with reference to the FIG. 1.

The POS distribution service 301 is configured to distribute the POS interface to the mobile device as a self-contained retail transaction processing system over a network connection.

The mobile POS system 300 also includes a POS interface 302. The POS interface 302 is implemented in a non-transitory computer-readable storage medium as executable instructions that process on a mobile device. The mobile device can include: a laptop, a tablet, a phone, and the like. The mobile device includes memory and one or more processors; the memory configured with the POS interface 302, which is configured to execute on the one or more processors of the mobile device. Example processing associated with the POS interface 302 was presented above in detail with reference to the FIG. 2.

The POS interface 302 is configured to be installed and initiated on the mobile device. The POS interface is configured to perform retail transactions from the mobile device and to interact on the backend with a backend cloud-based environment for details used with the retail transactions and to record other details associated with performing the retail transactions.

According to an embodiment, the mobile device is one of: a laptop, a phone, and a tablet.

In one case, the POS distribution service 301 is configured to interact with a network-based app store to publish and distribute the POS interface 302.

In yet another situation, the POS interface 302 is configured to control peripheral devices wirelessly when performing the retail transactions.

Figure 4:
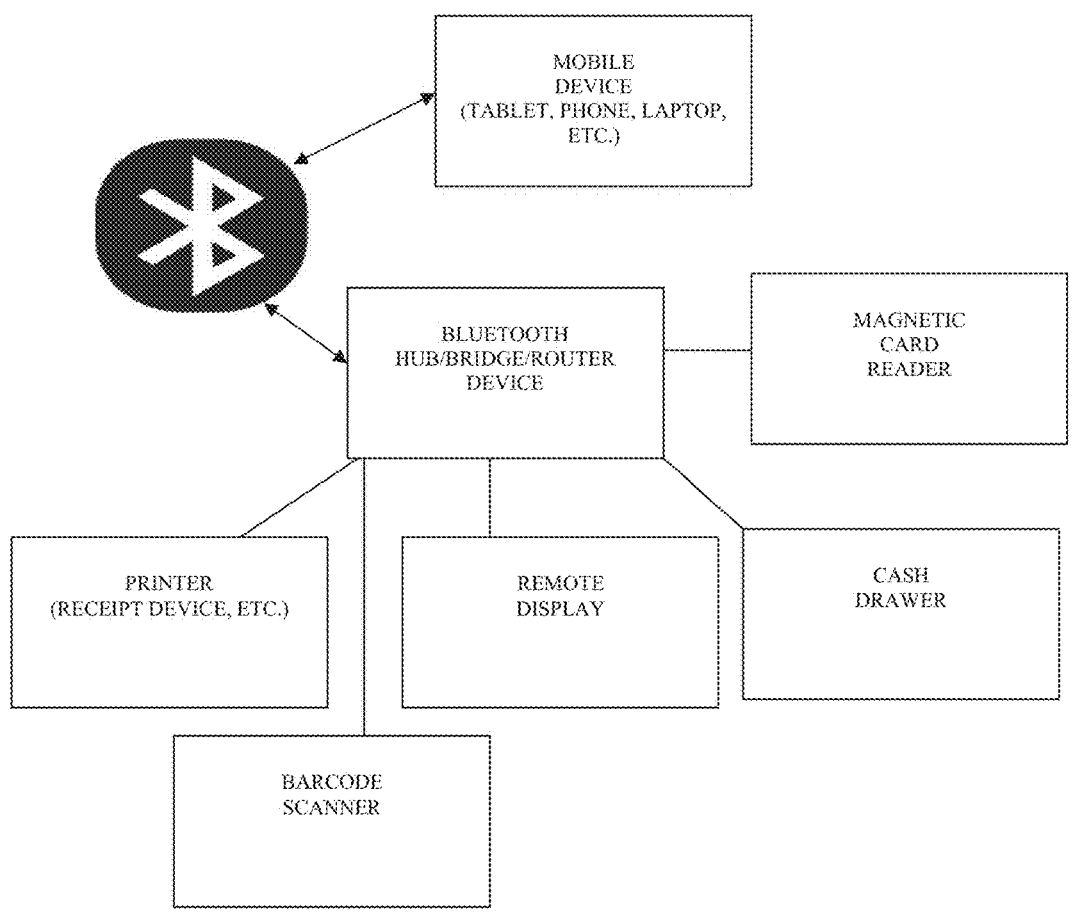
FIG. 4 is a diagram of a Bluetooth hub/bridge/router device, which the mobile device having the POS interface uses to control a variety of peripheral devices using Bluetooth communication, according to an example embodiment.

FIG. 4 is a diagram of a Bluetooth hub/bridge/router device, which the mobile device having the POS interface uses to control a variety of peripheral devices using Bluetooth communication, according to an example embodiment.

The POS interface is active on a mobile device (tablet, laptop, phone, etc.) and, as discussed above, controls a variety of peripheral devices (printer (receipt device), remote display, cash drawer, magnetic card reader, barcode scanner, and others).

The peripheral devices can be hardwired directly to the Bluetooth hub/bridge/router device, such as through a Universal Serial Bus (USB) cable connected from each peripheral device to a USB port integrated into the Bluetooth hub/bridge/router device.

The POS interface on the mobile device wireless communicates with each peripheral device via wireless Bluetooth communications from the mobile device to the Bluetooth hub/bridge/router device. There is no wired connection to the Bluetooth hub/bridge/router device from the mobile device.

In an embodiment, the Bluetooth hub/bridge/router device is referred to as a Bluetooth peripheral interface (BPI) device/hub and is a small box that supports a Bluetooth connection to a mobile device (iOS or Android) and has wired connections for standard POS peripherals (or any peripheral device). The targeted peripherals, in an embodiment and as shown in the FIG. 4, include a receipt printer, cash drawer, customer display, credit card reader (magnetic stripe or Europay MasterCard Visa (EMV)) and barcode reader. The peripherals are connected to the BPI device with either a USB or serial port connection. The BPI device can be mounted in the base of a tablet stand, paired with the tablet and either used while in the stand or carrying the tablet within range. The device can also be used without a stand and paired with a phone, tablet, or iPod.

In an embodiment, The BPI is Apple® certified through the Made for iPhone® or iPad® (MFI) program available through Apple®. In an embodiment, an Apple Bluetooth (BT) chip is included and the message set restricted to required messages to operate a restricted set of peripherals.

It is to be noted, however, that the Bluetooth hub/bridge/router device can be enabled to work with any peripheral and communicate with other operating systems and mobile devices that are not Apple® based, such as Android, Windows®, Linux, and others.

The described Bluetooth hub/bridge/router device permits a mobile device to wirelessly communicate with a variety of other peripherals, which may not support Bluetooth communications at all because the Bluetooth hub/bridge/router device acts as a translator to communicate via Bluetooth with the Bluetooth-enabled mobile device and to communicate via a USB or serial port with the peripheral devices. So, legacy peripheral devices can easily be integrated and communicate with a Bluetooth device (mobile device) via the Bluetooth hub/bridge/router device.

Figure 5:
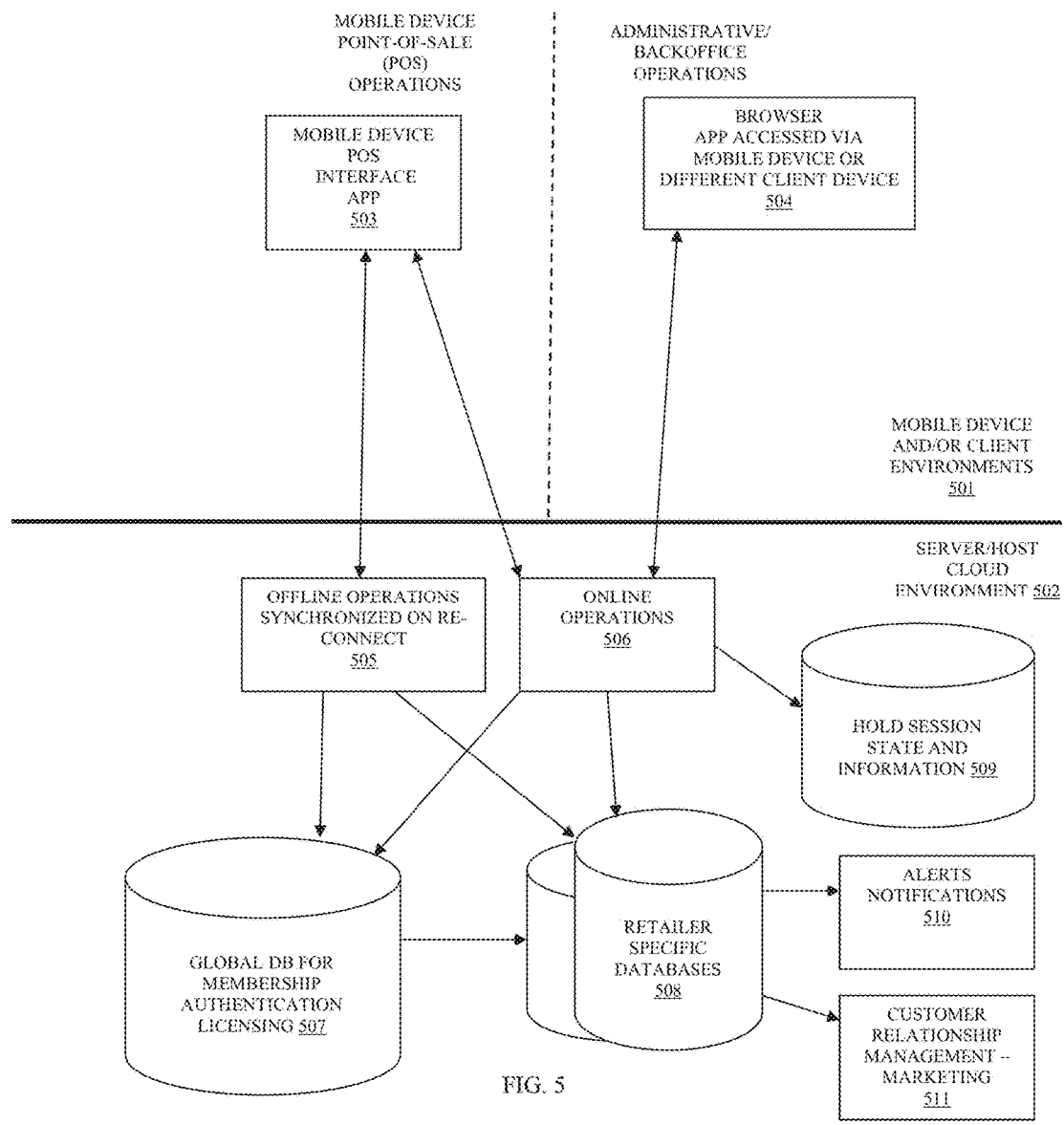
FIG. 5 is a diagram for an architecture of the mobile POS system, according to an example embodiment.

FIG. 5 is a diagram for an architecture of the mobile POS system, according to an example embodiment. The components of the architecture are implemented as executable instructions that reside in memory of a processor-enabled device or that reside within a non-transitory computer-readable storage medium. The components are executed by the processor-enabled device, which is specifically configured to process the components using its processors, memory, and accessible non-transitory computer-readable storage media.

It is noted that the components of the architecture are shown for purposes of illustration and that less components or more components may be used without departing from the teachings presented herein.

As discussed above there are primarily two processing environments with the techniques discussed herein. The first environment is the mobile device and/or client processing environments 501 and the second environment is the server/host cloud processing environment 502. Within the first environment there can be two separate environments for different devices and modes of operations. The first was discussed in detail above and is the processing associated with the POS interface app on the mobile device 503 and the second is a browser app accessed via the mobile device or an entirely different client device 504.

The browser app 504 can be accessed via a traditional web browser from a variety of processing devices having access to a network connection and a web browser. The browser app 504 is used by the retailer in performing administrative or back-office operations. These operations permit the products and services of the retailer to be defined along with pricing and other customizations that the retailer desires, such as but not limited to marketing campaigns, loyalty program details, coupons, contact information for customers, and the like.

The POS interface app 503 can also operate in two separate modes: offline 505 (where no network connection to the cloud environment 502 is available) and online 506 where the POS interface app 503 is actively communicating with the cloud environment 502 during retail transaction processing.

During the offline mode of operation 505, the POS interface app 503 records all details associated with transactions on the mobile device and once a connection is re-established with the cloud environment 502, the offline operations are synchronized 505 from the mobile device with the components of the cloud environment 502.

When a transaction is processed from the POS interface app 503, a global database (DB) 507 is initially consulted to determine retail subscription, licensing, membership, and authentication requirements. It is here also that a specific retailer's database 508 is resolved for the given transaction, since the architecture can service multiple independent and different retailers.

During online transaction operations 506, the session state and session information is recorded 509 for recovery purposes in the event of failures.

In an embodiment, the cloud environment 502 includes a task engine that allows the mobile device to asynchronously queue up tasks and optionally check on the results at a later point in time (e.g., offline synchronization of transactions with the cloud, emailing receipts, etc.). Such a fire-and-forget approach provides for increased throughput for the mobile device during transaction processing and provides for concurrent processing of tasks in the cloud environment 502 for multiple different retailers, which can be scaled dynamically as needed by adding additional servers to the cloud environment 502 to handle increased load when needed.

According to an embodiment, the task engine may also include retry capabilities to ensure task completion in the event of failing external dependencies (e.g., third-party mail server is temporarily down, Internet connectivity is down at the host, etc.). The task engine may also be interfaced with or include a task scheduler that allows tasks to be run at consistent times for each merchant (adjusting for each merchant's time zone), with optional overrides on a per merchant basis (e.g., run end-of-day processing tasks at 5 a.m. for all merchants but for Merchant X run end-of-day processing tasks at 7 a.m.).

Via the browser app 504, any particular retailer can configure a variety of policies and rules, which permit custom processing. Some of this custom processing is for custom alerts or notifications 510 and for customer relationship management (CRM) or marketing activities 511 (including email marketing activities). For example, a customer purchasing a specific product may raise an alert that alert can trigger processing in the CRM 511 to make additional offers to the customer related to other products or a free product based on the specific product purchased. So, in some instances, the alerts can be tied to the CRM 511 and vice versa.

As another example, consider that during a particular transaction an identity for the customer is tied to a particular classification for the customer that the retailer has customized, such as regular shopper, infrequent shopper, first-time shopper, or a shopper who has not visited the retailer in a retailer-set specific number of days. Based on this, a custom alert 510 is raised and captured, which triggers the CRM processing 511 and causes a personalized offer (i.e., coupon) to be emailed to an email address of the customer or even texted to a phone of the customer. As another example, the CRM 511 can send a "welcome" email or coupon to a first-time shopper or a "we miss you" email or coupon to a shopper who has not visited the retailer in a given period of time.

As another example, an alert 510 may be generated if a clerk processes a large transaction or if the clerk voids an excessive amount of merchandise. Such an alert 510 may be sent to store management in an effort to deter fraud by the clerk. An alert 510 may also be generated if no salesperson has logged into the POS interface app 503 by a certain specified time (e.g., opening time for a particular retailer is 10 a.m.) or if a salesperson is logged into the POS interface app 503 after a certain specified time (e.g., closing time for the particular retailer is 10 p.m.).

The customization that can be achieved is within the control of the retailer and the browser app 504 can be used to custom define the rules and policies associated with the alerts 510 and the CRM actions 511. The browser app 504 is menu driven and interactive so that even complex alerts 510 and CRM actions 511 can be easily defined by the retailer based on the retailer needs.

It is also noted that custom reports can be generated on demand, at predefined intervals (defined by retailer), and/or based on a specific alert 510. So, the alerts 510 can trigger other backend services, such as reporting, accounting, and/or marketing services. The browser app 504 can also be used to custom define reports and when the reports are produced. The content of the reports are also configurable by the retailer via the browser app 504.

Figure 6A:
FIGS. 6A-6S are sample screen shots of an example POS interface, according to an example embodiment.
Figure 6B:
Figure 6C:
Figure 6D:
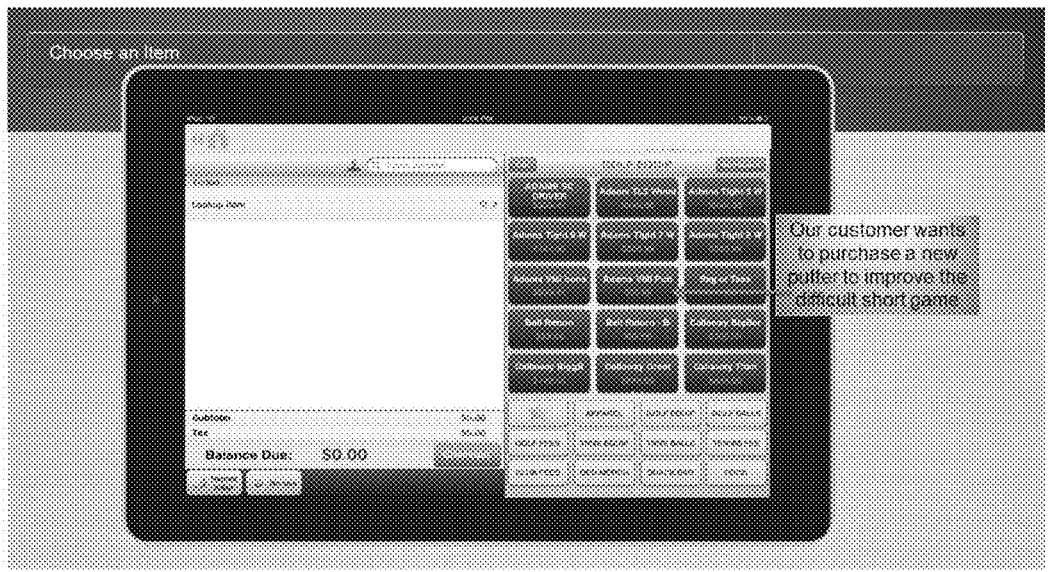
Figure 6E:
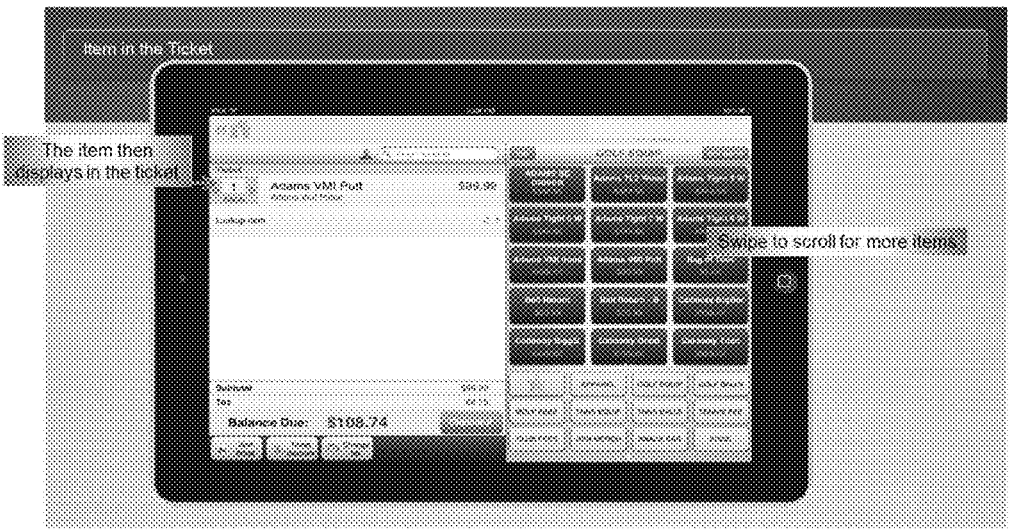
Figure 6F:
Figure 6G:
Figure 6H:
Figure 6I:
Figure 6J:
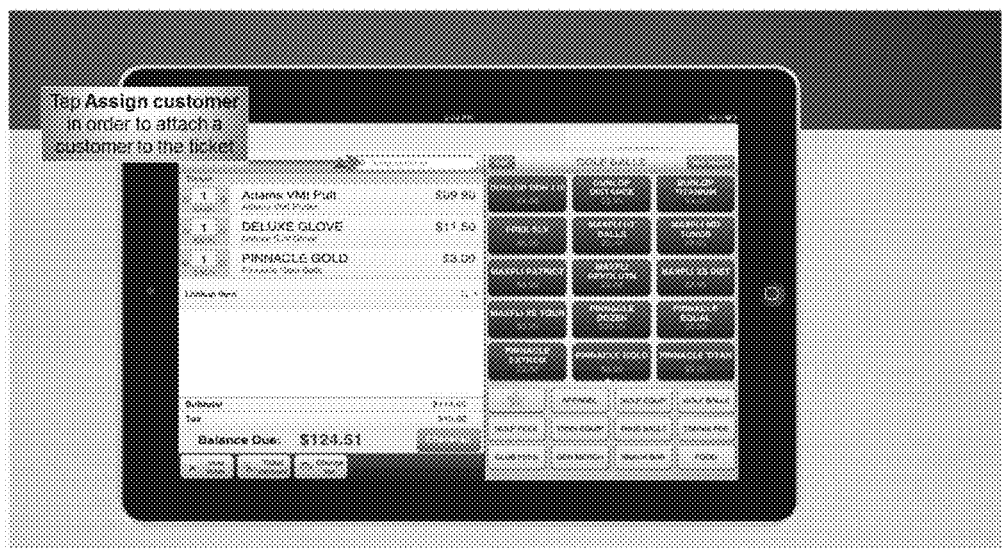
Figure 6K:
Figure 6L:
Figure 6M:
Figure 6N:
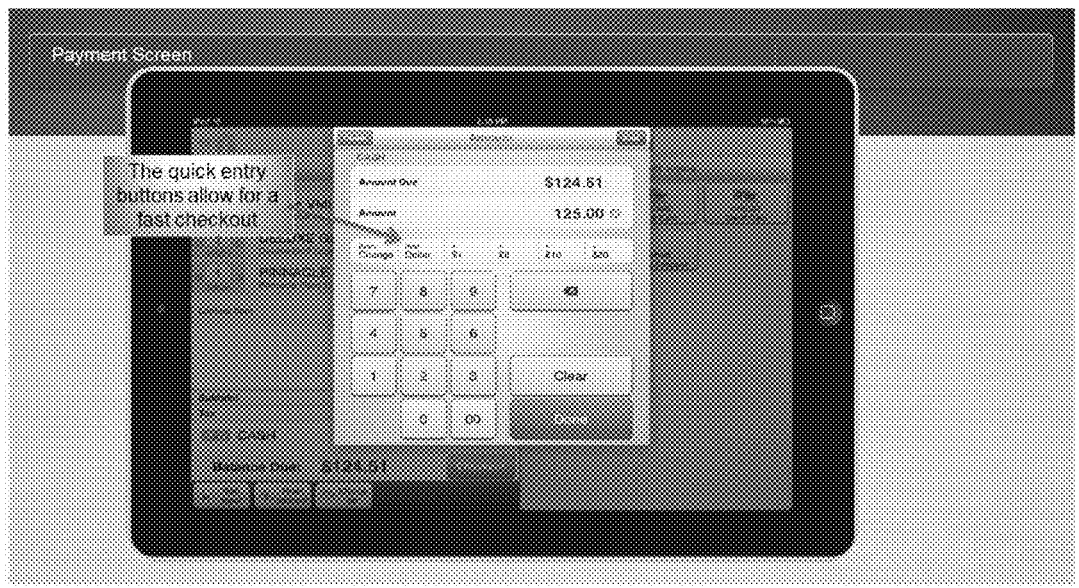
Figure 6O:
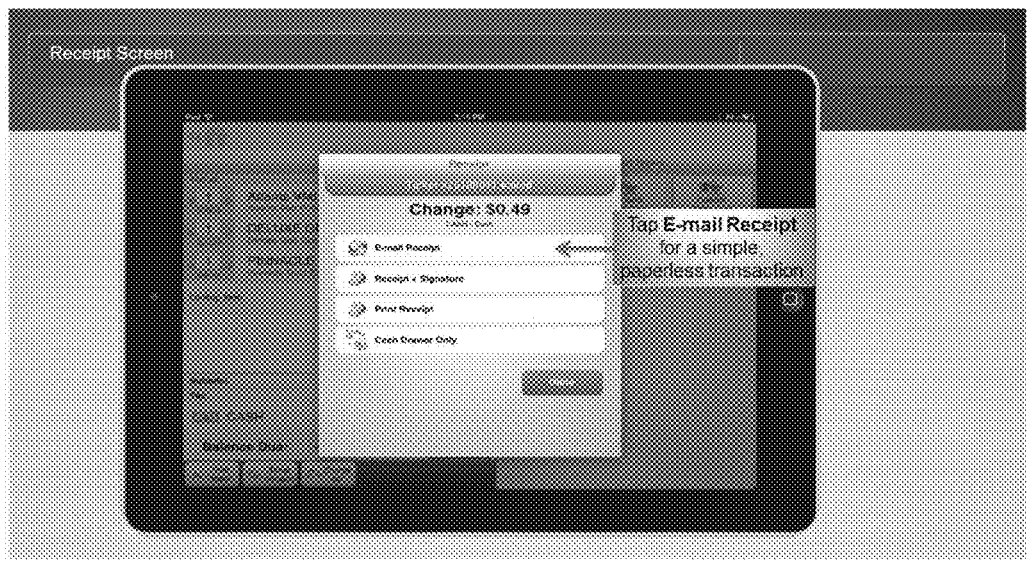
Figure 6P:
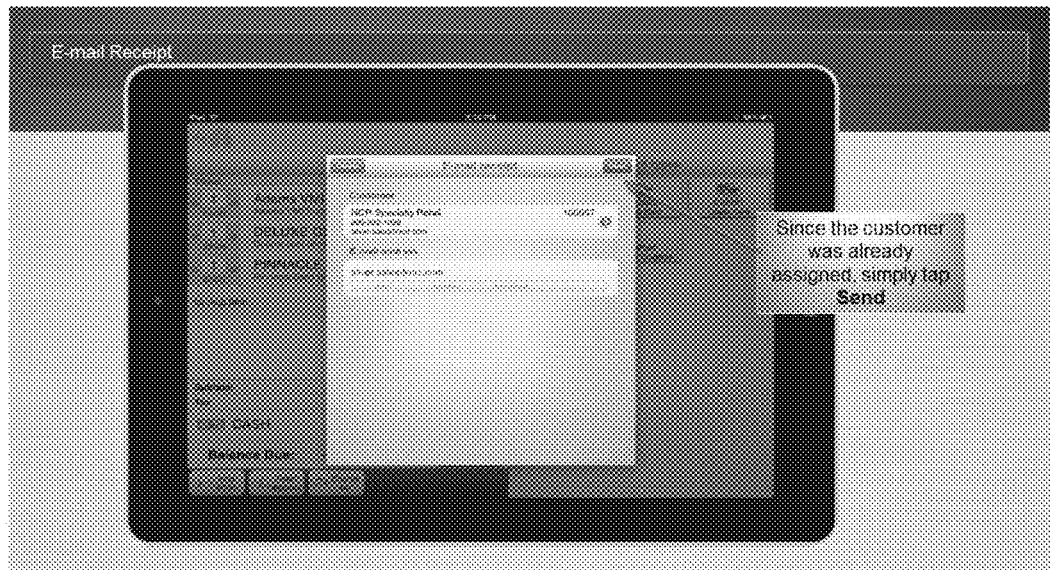
Figure 6Q:
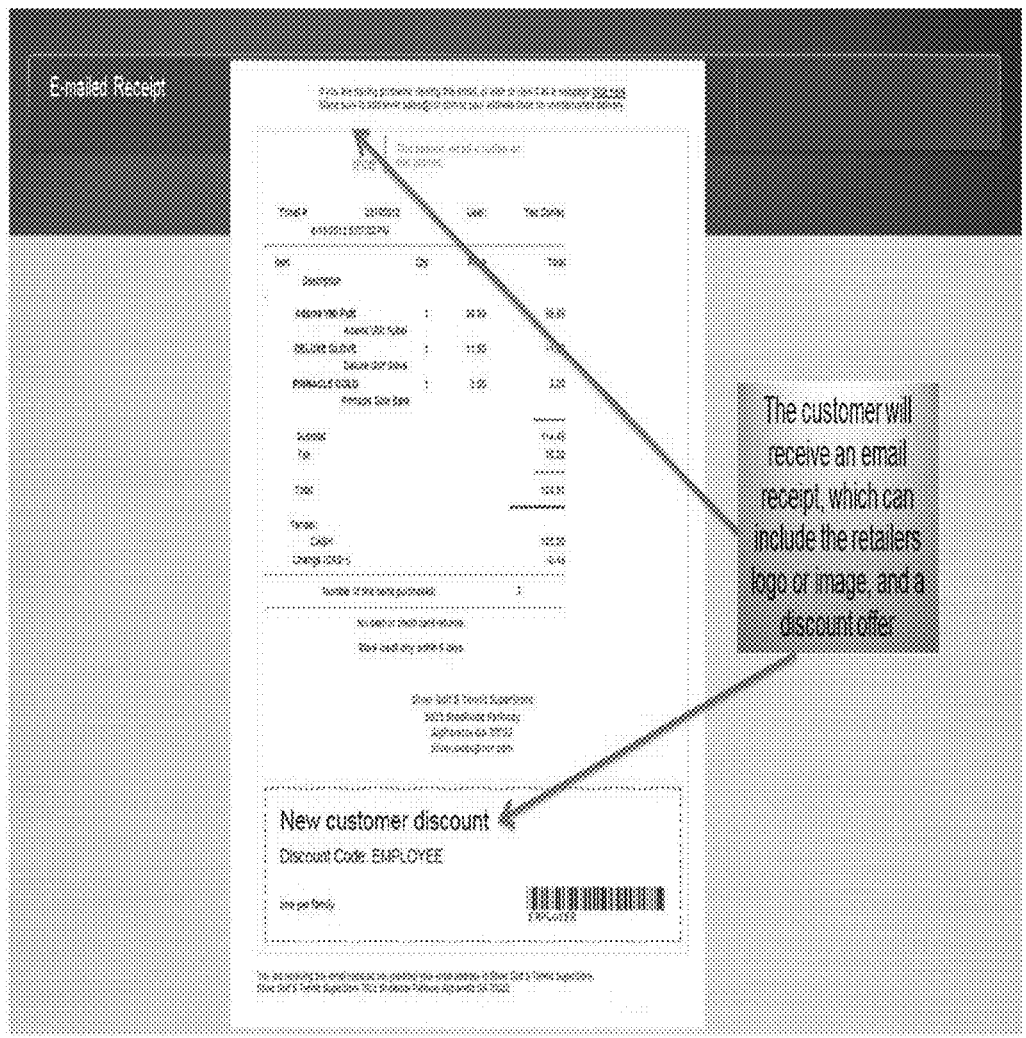
Figure 6R:
Figure 6S:

FIGS. 6A-6S are sample screen shots of an example POS interface, according to an example embodiment. The screen shots are presented for purposes of illustration and it is noted that other information and other fields may be used without detracting from the teachings herein. The FIGS. 6A-6S show an example transaction and the corresponding screen shots during that example transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for portable retail processing, the method programmed in a non-transitory computer-readable storage medium as executable instructions that are executed by a mobile device, the method comprising:
    remotely and dynamically acquiring, at the mobile device, a self-contained retail transaction system as a point-of-sale (POS) interface;
    dynamically installing, by the mobile device, the POS interface;
    dynamically initiating, by the mobile device, the POS interface;
    performing, by the mobile device, one or more retail transactions via the POS interface, and wherein the POS interface wirelessly controls peripheral devices by wirelessly interacting with a hub to which the peripheral devices have a wired connection and the POS interface wirelessly communicates with the hub to interact with peripheral devices that include a barcode scanner, a camera, a printer, a remote monitor, a magnetic card reader, a cash drawer, and a weighing device for produce when performing the one or more retail transactions and continues to conduct transactions when the mobile device is offline by recording transaction information when the device is offline and automatically processes the recorded transactions upon the mobile device returns to an online state, and wherein the POS interface operating as an encapsulated interface for a complete POS system, and wherein performing further includes accessing, by the POS interface a backend retail transaction processing system over a network when performing the retail transaction for accessing backend retail transaction services that include: retail accounting processing, retail reporting processing, and loyalty processing, thereby providing the portable retail processing from the mobile device;
    controlling, from the mobile device, a cash drawer on direction of the POS interface, the cash drawer wirelessly controlled during the one or more retail transactions; and
    emailing, by the mobile device, receipts for the retail transactions to consumer email accounts.

2. The method of claim 1 further comprising, interacting, via the mobile device, with a credit card processing service on direction of the POS interface, the interaction with the credit card processing service performed wirelessly during the one or more retail transactions.

3. The method of claim 1, wherein remotely acquiring further includes obtaining the PUS interface from a network-based application store.

4. The method of claim 1, wherein performing further includes interacting with a remote cloud processing environment to obtain details and record other details used with the one or more transactions, the POS interface wirelessly interacts with the remote cloud processing environment during the one or more transactions.

5. The method of claim 1, wherein performing further includes performing at least one transaction via the POS interface after the mobile device has lost network connectivity.

6. The method of claim 5 further comprising, updating a remote cloud processing environment with details for the at least one transaction when the mobile device has network connectivity restored.

7. A system for portable retail processing, comprising:
    a processor of a server machine configured with point-of-sale (POS) distribution service implemented within a non-transitory computer-readable storage medium and that executes on the processor; and
    a POS interface implemented within a non-transitory computer-readable storage medium and that executes on a mobile device;
    wherein:
    the POS distribution service is configured to dynamically distribute the POS interface to the mobile device as a self-contained retail transaction processing system over a network connection, the POS interface is a encapsulated interface representing a complete POS system through interactions a backend cloud-based environment to interact with backend retail transaction services and information, and the POS interface configured to perform retail transactions from the mobile device and interact with the backend cloud-based environment for details used with the retail transactions and to record other details associated with performing the retail transactions,
    the POS interface is configured to record specific transactions when the mobile device is offline and automatically process the recorded specific transactions when the mobile device reconnects to the backend cloud-based environment,
    the backend retail transaction services include: retail accounting processing, retail reporting processing, and loyalty processing, thereby providing the portable retail processing from the mobile device,
    the POS interface further configured to one or more of: email receipts for the retail transactions and text the receipts for the retail transaction, and
    the POS interface is further configured to interact with a hub to which peripheral devices have a wired connection and the POS interface wirelessly communicates with the hub to interact with peripheral devices that include a barcode scanner, a camera, a printer, a remote monitor, a magnetic card reader, a cash drawer, and a weighing device for produce during the retail transactions, the cash drawer being wirelessly controllable when backend retail transaction services are not available with cash drawer activity being reconciled when the backend retail transaction services again become available.

8. The system of claim 7, wherein the mobile device is one of: a phone, a laptop, and a tablet.

9. The system of claim 7, wherein the POS distribution service is configured to interact with a network-based application store to publish and distribute the POS interface.

10. The system of claim 7, wherein the POS interface is configured to wirelessly control peripheral devices when performing the retail transactions.

* * * * *